(12) United States Patent
Casamajou (10) Patent No.: US 8,149,947 B2
(45) Date of Patent: Apr. 3, 2012

(54) CHANNEL ESTIMATION OF MULTI-CARRIER SIGNAL WITH SELECTION OF TIME OR FREQUENCY DOMAIN INTERPOLATION ACCORDING TO FREQUENCY OFFSET OF CONTINUOUS PILOT

(75) Inventor: Yann Casamajou, Argences (FR)

(73) Assignee: NXP B.V., Eindhoven (NL)

( * ) Notice: Subject to any disclaimer, the term of this patent is extended or adjusted under 35 U.S.C. 154(b) by 318 days.

(21) Appl. No.: 12/523,822

(22) PCT Filed: Jan. 15, 2008

(86) PCT No.: PCT/IB2008/050130
§ 371 (c)(1),
(2), (4) Date: Jul. 20, 2009

(87) PCT Pub. No.: WO2008/093253
PCT Pub. Date: Aug. 7, 2008

(65) Prior Publication Data
US 2010/0008443 A1  Jan. 14, 2010

(30) Foreign Application Priority Data
Jan. 29, 2007 (EP) .................... 07290122

(51) Int. Cl.
*H04B 7/02* (2006.01)
*H04K 1/10* (2006.01)
*H04L 7/00* (2006.01)

(52) U.S. Cl. .......... 375/267; 375/260; 375/354
(58) Field of Classification Search .......... 375/260, 375/267
See application file for complete search history.

(56) References Cited

U.S. PATENT DOCUMENTS

| 6,205,188 | B1 * | 3/2001 | Stott et al. | 375/344 |
| 7,133,479 | B2 * | 11/2006 | Lee | 375/354 |
| 2004/0101046 | A1 * | 5/2004 | Yang et al. | 375/240.08 |
| 2004/0208267 | A1 * | 10/2004 | Lee | 375/354 |
| 2005/0213680 | A1 * | 9/2005 | Atungsiri et al. | 375/260 |
| 2006/0109780 | A1 * | 5/2006 | Fechtel | 370/203 |
| 2006/0109919 | A1 * | 5/2006 | Nieto | 375/260 |

FOREIGN PATENT DOCUMENTS
EP    1 528 740 A    5/2005
* cited by examiner

*Primary Examiner* — David C. Payne
*Assistant Examiner* — Sarah Hassan (57) ABSTRACT

A method of estimating the transmission channel of a received multi-carrier signal in a mobile environment, by identifying pilots present on carriers of the received multi-carrier signal, which pilots comprise continual pilots, performing channel estimation on the received multi-carrier signal using a time-domain interpolator to give a first interpolator output, and performing channel estimation on the received multi-carrier signal using a frequency-domain interpolator to give a second interpolator output. A frequency offset in a continual pilot is detected, and either the first or second interpolator output is selected based on the detected frequency offset. The invention also relates to a system for estimating the transmission channel of a received multi-carrier signal in a mobile environment.

12 Claims, 6 Drawing Sheets

FIG. 1
State of the art

CHANNEL ESTIMATION OF MULTI-CARRIER SIGNAL WITH SELECTION OF TIME OR FREQUENCY DOMAIN INTERPOLATION ACCORDING TO FREQUENCY OFFSET OF CONTINUOUS PILOT

FIELD OF THE INVENTION

The invention relates to a method of estimating the transmission channel of a received multi-carrier signal. The invention further relates to a system for estimating the transmission channel of a received multi-carrier signal.

BACKGROUND OF THE INVENTION

Orthogonal frequency-division multiplexing (OFDM) is used to perform digital modulation to transmit a data over a transmission channel using a multi-carrier signal. To date, OFDM is used to transmit data in digital communication systems such as asymmetric digital subscriber line (ADSL), wireless local area networks (WLAN), digital video broadcasting—terrestrial (DVB-T), etc. In OFDM data transmission, the available transmission channel is divided into a number of sub-channels, each with its own carrier, or sub-carrier, frequency chosen so that the frequencies are orthogonal to each other. As a result, data streams modulated with these carriers are ideally not subject to inter-channel interference (ICI), also called cross-talk. Modulation of the bit-stream to be transmitted is generally performed using standard modulation schemes such as quadrature amplitude modulation (QAM), phase-shift keying (PSK), etc. The binary bit stream to be transmitted is sub-divided into several bit streams of a certain length. Each of these smaller bit streams, for example groups of 4, 16, or even 1028 bits, is used to modulate a sub-carrier in a predefined manner, using amplitude and/or phase modulation to give a 'data symbol' in the resulting multi-carrier signal that is transmitted in its entirety. A complete set of modulated carriers is called a multi-carrier symbol, for example an 'OFDM symbol'. The number of carriers is predefined, for example 2K OFDM symbol has 2048 sub-carriers and could theoretically therefore transmit that many data symbols. Similarly, 4K OFDM and 8K OFDM could theoretically transmit up to 4096 or 8192 data symbols respectively. Broadcasting standards such as IEEE 802.11a define the rate at which an OFDM symbol is transmitted, i.e. the data rate, for a number of modulation schemes and the corresponding number of bits per symbol. A single OFDM symbol can have a duration of 1120 μs, i.e. the signal is 'in the air' for that length of time.

Typically, not all of the carriers in an OFDM symbol are modulated with data, or payload. In order to simplify reception of the signal being transmitted, certain predefined signals are transmitted with each block. For instance, some bandwidth efficiency is sacrificed so that 'guard intervals' can be inserted between multi-carrier symbols, while 'pilot' signals are periodically inserted at specific carriers for use during the synchronization and equalization phase. By spacing the pilots sufficiently close in the multi-carrier signal, correct channel estimation and interpolation are made possible for the received signal, even in the case of long echoes, for which the density of the fading in the spectrum becomes high.

Transmission channel estimation for a received signal is usually simply referred to as equalization, which is generally quite straightforward as long as the transmitter and receiver are essentially stationary with respect to one another, and channel estimation is generally achieved in a 'static' equalizer by performing a time-domain interpolation on certain pilots in the received signal, thus determining the corresponding sub-carriers, and then performing a frequency-domain interpolation to determine the remainder of the sub-carriers. Such a static equalizer requires a sequence of complete multi-carrier symbols to estimate the channel correctly. It is necessary to be able to perform accurate channel estimation on the received signal, i.e. to identify the carriers, in order to be able to determine the data payload, even if the signal arriving at the receiver has been subject to attenuation and multipath (echo). OFDM works optimally in static environment, i.e. when the transmitter and equalizer are essentially stationary with respect to each other. This is generally the case for transmission systems using ADSL, DVB-T, WLAN, etc. Low velocities are tolerable without a noticeable degradation in performance. However, at higher speeds, for example when a user of a hand-held device (such as a mobile phone or pocket personal computer) is receiving a television broadcast while in a car or train, the received signal will be further distorted to a greater or lesser extent owing to the Doppler effect—i.e. the wavelengths of the carriers will be 'compressed' or 'stretched', depending on the direction and speed of travel of the user with respect to the transmitter. The resulting perceived shift in the carrier frequencies results in a corruption of their orthogonality, which is increased even further by the time-interpolation, resulting in failures in the channel estimation process. As a result, the user's device may fail to regain the originally transmitted data from the received signal.

The use of devices with digital video broadcasting—handheld (DVB-H) capability is becoming more popular, and various attempts are being made to address the problem of Doppler shift in the received OFDM signal. Since time-domain interpolation cannot be used reliably in a fast-changing environment, a frequency-domain analysis of the received signal can be performed to estimate the channel. Frequency-domain interpolation alone, without time-domain interpolation, is better in a mobile environment since no assumptions need be made regarding the temporal stability of the channel. Therefore, some prior art systems use both methods, and determine a point at which a switch-over should be made, as appropriate. However, state of the art solutions that are based on a switchover between time-domain and frequency-domain equalization are not fast enough in reacting to a rapid increase in velocity between the transmitter and receiver, since they require a large number of consecutive symbols in order to arrive at the decision to make the switch-over. Furthermore, these state of the art solutions are generally quite complex at the receiver end.

OBJECT AND SUMMARY OF THE INVENTION

Therefore, it is an object of the invention to provide a straightforward and economical way of performing equalization in an OFDM receiver.

To this end, the present invention provides a method of estimating the transmission channel of a multi-carrier signal in a mobile environment, which method comprises identifying pilots present on carriers of the received multi-carrier signal, which pilots comprise continual pilots. Channel estimation is performed on the received multi-carrier signal in parallel using a time-domain interpolator to give a first interpolator output, and a frequency-domain interpolator to give a second interpolator output. At the same time, any frequency offset in a continual pilot is detected, and either the first interpolator output or the second interpolator output is selected on the basis of the detected frequency offset.

The method according to the invention can be applied to any multi-carrier signal comprising continual pilots. For the sake of simplicity, however, it is assumed in the following that the multi-carrier signal is an OFDM signal as described in the introduction, without restricting the invention in any way.

The 'time-domain' interpolation can be followed by an additional frequency-domain interpolation, and, since relatively stationary conditions are required for successful equalization using this technique, this type of equalizer may simply be referred to as a 'static equalizer'. Static equalization is based on an assumption that the channel characteristics will not change significantly from one multi-carrier symbol to the next, and can use this property to provide an accurate channel estimation.

One type of pilot, the 'scattered' or 'punctured' pilot, is spaced at intervals in an OFDM symbol, but the positions change from one symbol to the next, and these scattered pilots are used by the time-domain or static equalizer to estimate the channel using a sequence of multi-carrier symbols. Another type of pilot, the 'continual' pilot, is a pilot that is always present at the same carrier in an OFDM symbol, and is identified on the basis of its known carrier or known modulation. Usually, many continual pilots are spaced evenly throughout an OFDM symbol, for example, at every 12th carrier. In the method according to the invention, one or more continual pilots are identified and examined to determine if they have been subject to a frequency shift, or offset, which would indicate that the received signal has undergone a Doppler shift. According to the invention, frequency-domain interpolation is performed on the received signal in parallel to the time-domain interpolation. If a frequency offset is identified on one or more continual pilots, the output of the frequency-domain interpolator is used by the equalizer, and the time-domain interpolator output is discarded.

An obvious advantage of the method according to the invention is that a frequency offset or Doppler shift in the received signal can easily and quickly be identified on the basis of the continual pilots whose positions in each OFDM symbol are known, since the frequency-domain interpolator does not make any assumption as to the stability of the channel. Therefore, the switchover from the time-domain interpolator to the frequency-domain interpolator can take place in good time, before failure of the time-domain interpolator, allowing data to be recovered from the multi-carrier signal also in a mobile environment. Since the continual pilots of the received signal are continually examined for any frequency offset, it can easily be determined if the transmitter and receiver are once more essentially stationary with respect to each other, so that a switchover back to the—preferred—time-domain interpolation can also be carried out in an easy and straightforward manner. Furthermore, since the frequency-domain interpolator uses the continual pilots of an OFDM symbol, whose positions in the symbol are known, this interpolator can estimate the channel using only a single OFDM symbol. The decision to switch over, therefore, can be made more rapidly than is possible in other state of the art systems. In this way, the best channel estimation method to estimate the transmission channel of a multi-carrier signal in a mobile environment can be easily and rapidly chosen.

An appropriate system for estimating the transmission channel of a received multi-carrier signal in a mobile environment comprises an identification unit for identifying pilots present on carriers of the received multi-carrier signal which pilots comprise continual pilots, a time-domain interpolator for performing channel estimation on the received multi-carrier signal to give a first interpolator output, and a frequency-domain interpolator for performing channel estimation on the received multi-carrier signal to give a second interpolator output. The system further comprises an offset detection unit for detecting a frequency offset in a continual pilot, and a selection unit selecting either the first interpolator output or the second interpolator output on the basis of the detected frequency offset.

The dependent claims and the subsequent description disclose particularly advantageous embodiments and features of the invention.

A frequency offset on a transmitted signal arises when the source, or transmitter, of the signal moves with sufficient velocity towards the recipient of the signal, or away from the recipient. For instance, when the transmitter is moving relatively rapidly towards the receiver, the latter receives a compressed version of the signal, i.e. the wavelength of the signal is shortened, so that the frequency of the received signal appears to be higher. Therefore, in a preferred embodiment of the invention, the step of detecting a frequency offset in a continual pilot comprises filtering the continual pilot in a digital offset filter to obtain an offset power value and estimating the frequency offset on the basis of the offset power value. For example, the offset filter can be a band-pass filter, or even a combination of a low-pass and a high-pass filter, for frequencies above (or below) the pilot carrier frequency. When the output of the offset filter is non-zero, that means that the signal filtered by this offset filter comprises components with frequencies beyond the cut-off frequency of the filter. Evidently, the offset filter could be a band-pass filter that only detects frequency components within a certain bandwidth, i.e. frequency components that are higher than a first cut-off frequency and lower than a second cut-off frequency. The output of such a digital filter generally comprises a series of coefficients, one for each filter tap, where the size of each coefficient corresponds to the strength, or power, of the pertinent signal component.

As mentioned above, a time-domain interpolator for a multi-carrier signal such as an OFDM signal can cope with a relative velocity, as long as this velocity is not so great as to cause significant distortion of the received signal. The capabilities of the time-domain interpolator will depend on the type of symbol received (2K OFDM, 8K OFDM, etc.), the size of the guard interval between symbols, the signal-to-noise ratio, etc. These factors will be known to a person skilled in the art and need not be explained in greater detail here. In brief, the output of the offset filter can be non-zero without necessarily requiring a switch-over to the frequency-domain interpolator. Therefore, in a particularly preferred embodiment of the invention, the frequency offset is estimated by comparing the offset power value to a threshold power value corresponding to a maximum allowable power that may detected by the offset filter without causing failure of the time-domain interpolation. A signal with components detected by the offset filter whose overall power is less than the threshold power value will continue to be interpolated using the preferred time-domain interpolator, whereas any signal for which components with power greater than the threshold power value will cause a switchover to the frequency-domain interpolator. Since this threshold power value is system-dependent, it is preferably programmable so that the behaviour of the offset filter can be adapted to the requirements of the system.

There may be any number of different time-domain interpolators available, and these may cope to varying degrees with frequency offsets on received signals. The amount of offset at which a particular time-domain interpolator will fail can be obtained experimentally to give a predefined tolerance, or maximum offset frequency. Therefore, the cut-off frequency of the offset filter for an equalizer according to the invention is preferably chosen to correspond to the predefined offset frequency at which the time-domain interpolator is subject to failure.

When a particular carrier of a multi-carrier signal is filtered using a suitable digital band-pass filter in stationary or static conditions, the output of the band-pass filter ideally comprises one strong component. In a mobile environment, however, the carrier signal is subject to a frequency shift, with a resulting spread in power, so that the output of that same band-pass filter shows a weak component in place of the strong component. This fact can be put to good use in the method according to the invention. For instance, a certain continual pilot can be filtered using a dedicated pilot carrier band-pass filter. The filter output in stationary conditions, i.e. a strong filter output value, is used as a pilot reference power value. For each incoming multi-carrier symbol, this continual pilot is filtered using the dedicated pilot carrier band-pass filter. A decrease in the current filter output, therefore, might correspond to a frequency shift on the incoming multi-carrier symbol. This can be used as an additional factor in deciding when to make the switchover from the time-domain interpolator to the frequency-domain interpolator. Therefore, in a further preferred embodiment of the invention, the second interpolator output is selected when the offset power value is greater than the threshold power value, and the output of the pilot carrier band-pass filter is less than the pilot reference power value.

The system according to the invention preferably comprises a comparator for comparing an offset filter output to its respective power threshold value, and optionally to compare a pilot carrier band-pass filter output to its corresponding pilot reference power value. If the offset filter output is greater than the power threshold value, as described above, the comparator can make the decision to switch from the time-domain interpolator to the frequency-domain interpolator. This decision can be supplemented by an optional pilot carrier band-pass filter output value. For instance, it may be that the offset filter output is ambivalent. In this case, if the pilot carrier band-pass filter output value is sufficiently less than the corresponding pilot reference power value, the comparator can decide to switch over, otherwise it may decide to remain with the time-domain interpolator for the time being, since time-domain interpolation is the preferred mode of interpolation under satisfactory conditions. The comparator continually compares the filter outputs with their respective pilot reference power and threshold values in order to decide when to switch from the time-domain interpolator to the frequency-domain interpolator and vice versa. As long as the received signal is subject to a frequency offset, interpolation is carried out by the frequency-domain interpolator. As soon as the incoming signal stabilizes, the comparator causes a switchover back to the time-domain interpolator.

Naturally, a single pilot carrier band-pass filter or a single offset filter may not be sufficient for deciding when to make a switchover using the method according to the invention. A relatively large number of carriers in an OFDM symbol are assigned to continual pilots, for example, every 12th carrier in an 8K OFDM symbol can be a continual pilot as laid down in the DVB-T and DBV-H standards. Therefore, in an offset detection unit according to the invention, there may be a pilot carrier band-pass filter and an offset filter for each of the continual pilots in the symbol. Alternatively, it may suffice to provide an offset filter and a pilot carrier band-pass filter for only a subset of the continual pilots. Equally, since the pilot carrier band-pass and offset filters are digital filters, these may be programmable to filter any of the continual pilots of the incoming multi-carrier symbol, so that a single hardware implementation of the filter can be shared between several pilots.

The time-domain and frequency-domain interpolators of the system according to the invention can perform complete channel estimation, i.e. each of the interpolators can identify each of the carriers of the incoming multi-carrier symbol to obtain the channel transfer function required for recovery of the original transmitted data. However, a time-domain interpolator requires a certain number of entire OFDM symbols to interpolate all of the carriers, since time-domain interpolation uses the scattered pilots, and a 'full set' of scattered pilots is distributed over a number of OFDM symbols. This is one of the reasons why complete channel estimation by time-domain interpolation is costly. Therefore, in an alternative embodiment according to the invention, the system can comprise a rudimentary time-domain interpolator and a rudimentary frequency-domain interpolator, operating in parallel as described above, to perform partial channel estimation. For instance, these interpolators may identify one quarter of the carriers. A supplementary frequency-domain interpolator downstream of the selection unit can perform an additional channel estimation on the selected interpolator output to complete the interpolation. Such a system allows a more economical realisation, since it suffices to perform only a partial channel estimation in either the time-domain or frequency-domain, and further channel estimation is subsequently carried out in the supplementary frequency-domain interpolator.

The steps of the method described above can be carried out by appropriate digital hardware and software modules. For example, any signal filtering can be carried out using suitable integrated circuits. These can be programmable to adjust filter taps and/or cut-off frequencies. A computer program product comprising such software modules can be directly loaded into the memory of a programmable device, such as a processor, for use in a system for estimating the transmission channel of a multi-carrier signal.

Other objects and features of the present invention will become apparent from the following detailed descriptions considered in conjunction with the accompanying drawing. It is to be understood, however, that the drawings are designed solely for the purposes of illustration and not as a definition of the limits of the invention.

DESCRIPTION OF EMBODIMENTS

In the diagrams, like numbers refer to like objects throughout.

Figure 1:
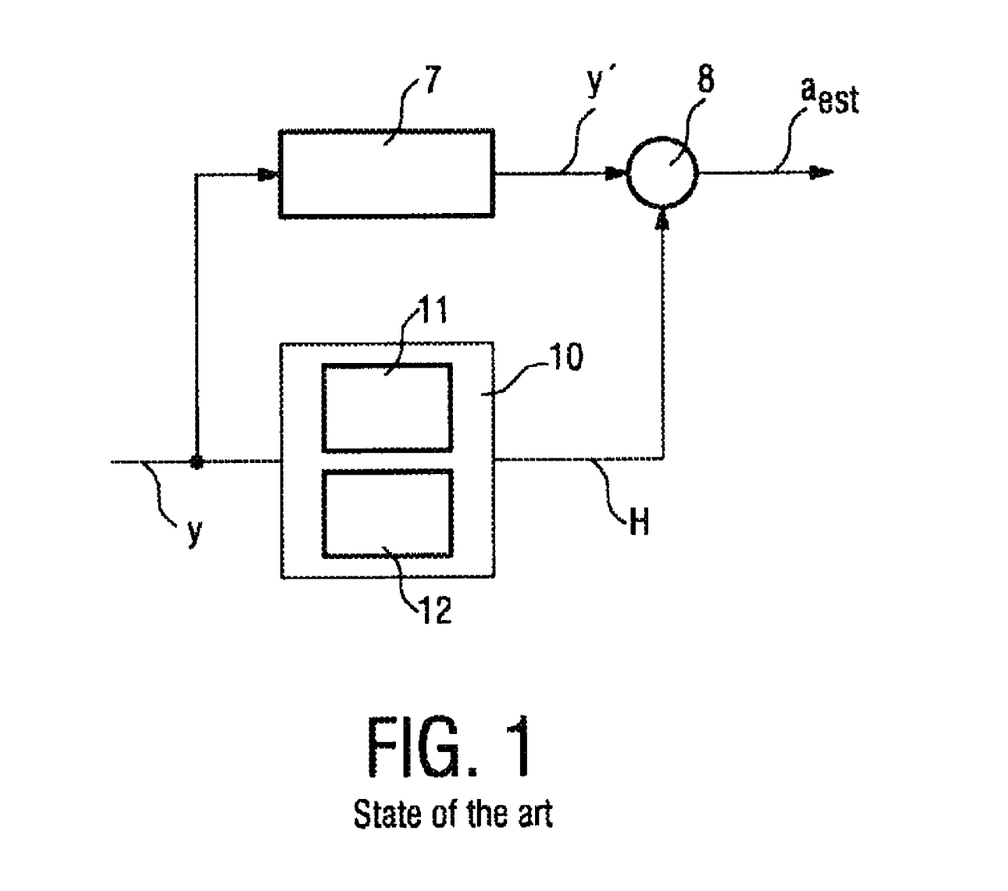
FIG. 1 shows a block diagram of an equalizer according to the prior art for performing channel estimation on a multi-carrier signal.

FIG. 1 shows a very simplified block diagram of an equalizer according to the state of the art. Only the blocks relevant to the following discussion are shown, and it will be understood that equalization involves a much greater number of stages than shown here, such as blocks for performing discrete fast-Fourier transformations, forward error correction, etc., as will be known to a person skilled in the art. A received multi-carrier signal y is input to an equalizer 10, where a first interpolator 11 performs static equalization, and a second interpolator 12 performs frequency-domain interpolation. The system can switch between the two equalizers, for example using one of the techniques of the prior art documents mentioned in the introduction. At the same time, the input signal y is delayed in a delay block 7 to compensate for the fact that the time-domain interpolation requires a certain length of time, for instance a certain number of OFDM symbols, before it can successfully estimate the channel characteristics. In a convolution unit 8, the delayed signal y' is then convolved with the channel transfer function H supplied by the equalizer 10 to give an estimation $a_{est}$ of the originally transmitted data. In an ideal equalizer operating under ideal conditions and with an undistorted input signal, the output signal $a_{est}$ corresponds to the originally transmitted data, but, in practice, errors accumulate in the transmission and equalization stages, so that, even under stable—i.e. more or less stationary—operating conditions, the output signal contains bit errors and packet errors. Their rates of occurrence are referred to by the bit error rate (BER) and packet error rate (PER), respectively. Should the transmitter and receiver be in motion with respect to one another, these error rates can rise dramatically, particularly when the velocity approaches the Doppler offset frequency. Since the prior art equalizers take relatively long to identify a frequency offset, the error rates that result can be unacceptably high.

Figure 2A:
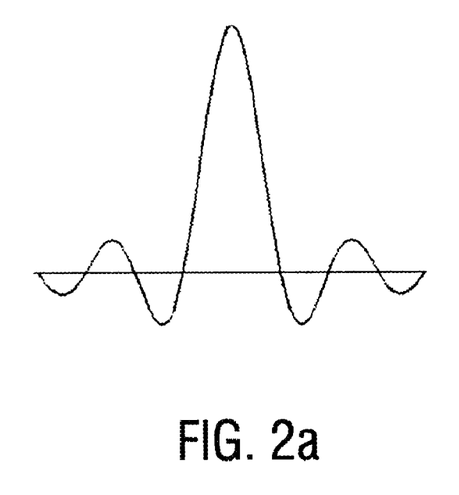
FIG. 2a shows the spectrum of a carrier in a multi-carrier signal.
Figure 2B:
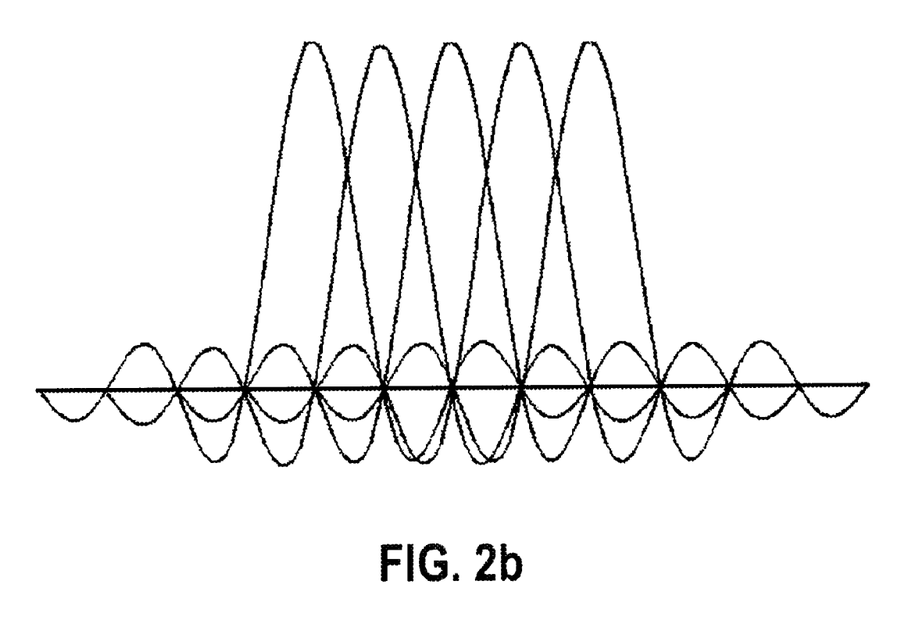
FIG. 2b shows overlapping spectra of a number of carriers in a multi-carrier signal.

As already described, a multi-carrier signal is generated by modulating each of a number of carriers with a data signal. FIG. 2a shows the spectrum of a single carrier of a multi-carrier signal. The frequencies of the carriers are chosen so that they are orthogonal, which means that, in a composite signal comprising a number of superimposed carriers, the spectra of the carriers do not overlap, as is shown in FIG. 2b.

Figure 3:
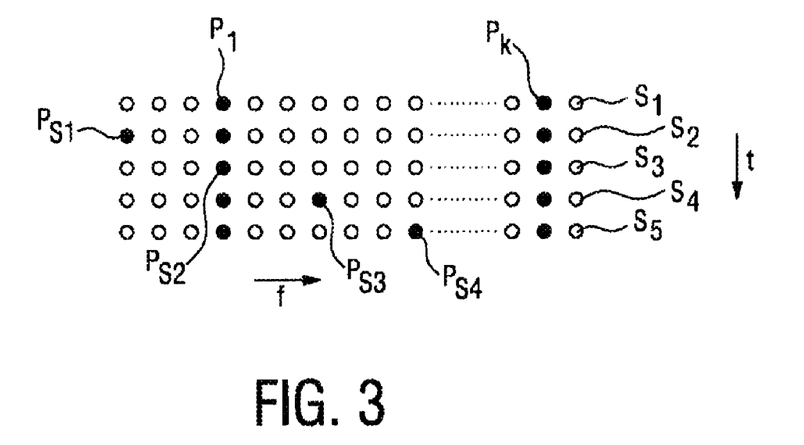
FIG. 3 shows a schematic representation of data and pilot carriers in an OFDM symbol.

To transmit a digital signal using OFDM, the bit-stream to be transmitted is first divided into a number of smaller bit streams, for example 4-bit, 8-bit, or 16-bit bit streams. Each of these smaller bit streams is then used to modulate a single carrier, using a suitable method such as QAM. For example, a 4-bit bit stream can have one of 16 different bit patterns, each of which can modulate the carrier by altering its amplitude by a specific amount. The resulting modulated carrier is termed a data symbol. Certain carriers, as already mentioned, are dedicated to pilots. An OFDM symbol is essentially a sequence of data symbols interspersed with pilot symbols, as shown schematically in FIG. 3. In the diagram, each horizontal row represents the same subset of an OFDM symbol $S_1$, $S_2$, $S_3$, $S_4$, $S_5$. The white dots represent data symbols, while the shaded dots arranged in a vertical column represent continual pilots $P_1, P_2, \ldots, P_k$. The other shaded dots, arranged diagonally, represent the scattered pilots $P_{S1}$, $P_{S2}$, $P_{S3}$, $P_{S4}$ used by the time-domain interpolator. The continual pilots $P_1, P_2, \ldots, P_k$ are always found at the same relative location in each successive OFDM symbol $S_1$, $S_2$, $S_3$, $S_4$, $S_5$, while the positions of the scattered pilots $P_{S1}$, $P_{S2}$, $P_{S3}$, $P_{S4}$ change from one symbol to the next. The frequency axis shows that the data symbols and pilots are arranged in order of increasing carrier frequency, while the time axis t indicates that the OFDM symbols $S_1$, $S_2$, $S_3$, $S_4$, $S_5$ are received one after the other.

Figure 4A:
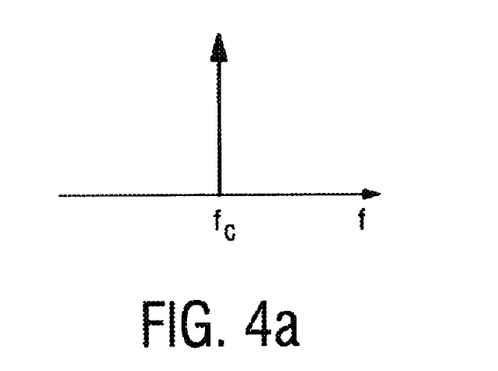
FIG. 4a shows the frequency spectrum of a continual pilot in a stationary environment.

A signal of essentially a dominant frequency will have a strong frequency response. FIG. 4a shows the frequency spectrum of a continual pilot in a stationary environment. The frequency response shows a single strong component. This fact is put to good use in the method according to the invention, where the continual pilots are filtered to see if their frequency responses have undergone an alteration. A filter with a tap for the frequency of a continual pilot carrier should always show a strong component when the system (i.e. transmitter and receiver) is operating in an essentially stationary environment, and this is stored as a pilot reference power value for later use. Since a real-life system is not ideal, the output of such an appropriate filter, in a mobile environment, will show a strong component and several smaller components at frequencies above (or below) the strong component, but these are of no relevance as long as the relative velocity between transmitter and receiver is low. In this situation, the time-domain interpolator is preferred.

Figure 4B:
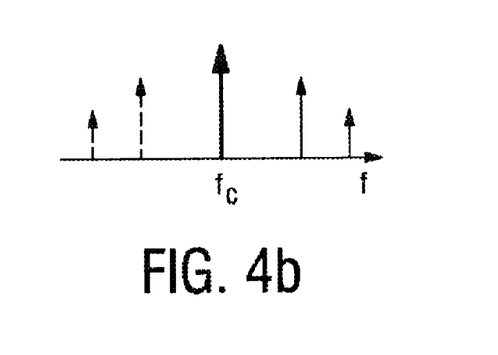
FIG. 4b shows the frequency spectrum of a continual pilot in a mobile environment.

At a greater relative velocity, the frequency offset experienced by the OFDM signal causes a shift in the frequencies perceived by the equalizer. FIG. 4b shows the frequency spectrum of a continual pilot in a mobile environment. As can be seen from the figure, the overall power of the signal is no longer concentrated at the original carrier frequency $f_c$, but is 'spread' into higher or lower frequency regions depending on whether the transmitter and receiver are moving towards or away from each other, respectively. The signal components in higher frequency regions are indicated to the right of the carrier frequency $f_c$ in the diagram, and the signal components in lower frequency regions are indicated by dashed lines on the left of the carrier frequency $f_c$. When the OFDM signal is subject to a frequency offset of sufficient severity, the carrier frequencies are no longer orthogonal. This is reflected in the filter output of the diagram, in which it can be seen that the frequency components of the distorted signal have become too large, whereas the signal component corresponding to the original carrier frequency $f_c$ has become considerably smaller. At this point, a time-domain interpolation of the received signal will most likely fail because of the inter-carrier interference.

Figure 5:
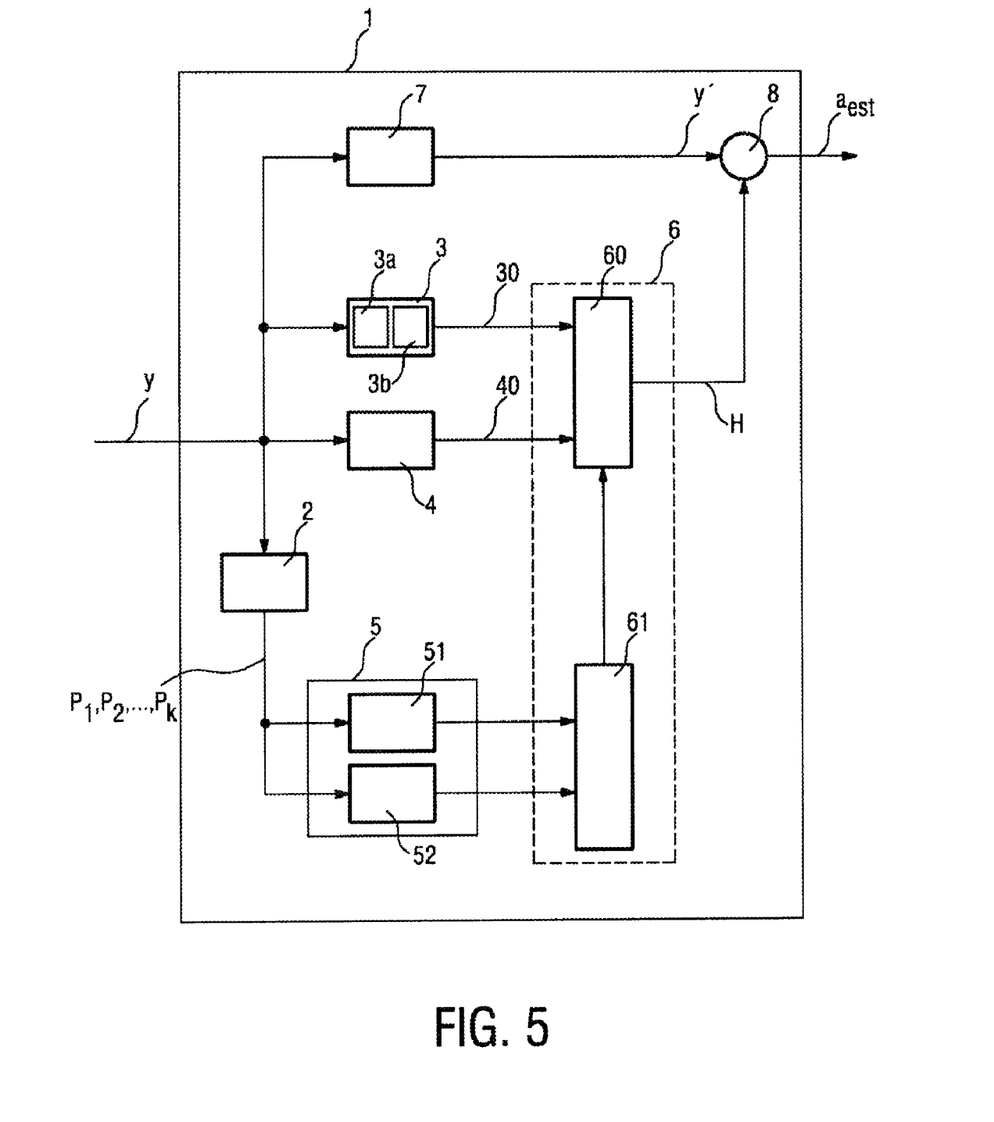
FIG. 5 shows a system for performing equalization on a multi-carrier signal according to a first embodiment of the invention.
Figure 6A:
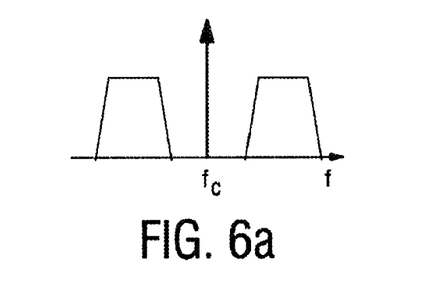
FIG. 6a shows the frequency response of an offset filter in a a stationary environment.
Figure 6B:
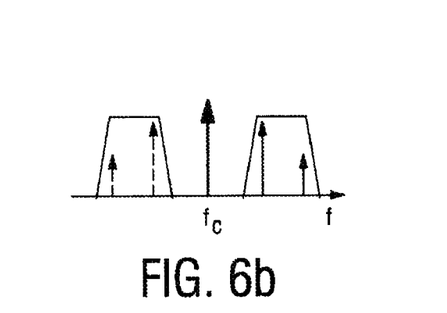
FIG. 6b shows the frequency response of the offset filter of FIG. 6a in a mobile environment.

FIG. 5 shows a system 1 for performing equalization on a multi-carrier signal y in a mobile environment according to a first embodiment of the invention. Here, a time-domain interpolator 3 and a delay element 7 as described above under FIG. 1 are shown. The time-domain interpolator 3 can comprise a block 3a for performing a partial channel estimation using scattered pilots, and a frequency-domain interpolation block 3b for completing the channel estimation. An additional frequency-domain interpolator 4 operates in parallel to the static equalizer 3. The incoming OFDM signal y is also forwarded to an identification unit 2 which identifies the continual pilots $P_1, P_2, \ldots, P_k$ in the OFDM signal. An offset detection unit 5 determines whether the continual pilots $P_1, P_2, \ldots, P_k$ have been subject to a frequency offset. In this embodiment, the offset detection unit 5 comprises a pilot carrier band-pass filter 51 to detect a drop in power of a pilot carrier, and an offset filter 52 to detect a spread in power of that pilot carrier. Only a single block is shown for each of the filters 51, 52 respectively, but it is clear that a pilot carrier band-pass filter and an offset filter can be assigned to each pilot carrier of the OFDM symbol. In FIG. 6a, the output of an offset filter in a stationary environment is shown. Here, the offset filter comprises a band-pass filter for higher frequencies (to the right of the pilot carrier frequency $f_c$), and a band-pass filter for lower frequencies (to the left of the pilot carrier frequency $f_c$). As can be seen, the output of these filters show no significant signal components beyond their cut-off frequencies. FIG. 6b shows the frequency response of same offset filters in a mobile environment. In this case, owing to a frequency shift, the power in the carrier signal is spread, so that the continual pilot now has signal components with frequencies beyond the offset filter's cut-off frequency, either above the pilot carrier frequency $f_c$, as shown in the band on the right-hand side, or below the pilot carrier frequency $f_c$, as shown in dashed lines in the band on the left -hand side The outputs of the pilot carrier band-pass and offset filters 51, 52 are examined in a comparator block 61 in order to decide which interpolator output 30, 40 should be selected. If the current output of the pilot carrier band-pass filter 51 shows a drop in signal power and the offset filter 52 shows a spread in signal power above a predefined threshold, as described above, the comparator 61 indicates to a switch 60 that the output 40 of the frequency-domain interpolator 4 is to be selected, since the incoming signal y has been subject to a Doppler shift and the time-domain interpolator may fail. Otherwise, the comparator 61 controls the switch 60 so that the output 30 of the time-domain interpolator 3 is selected. The chosen interpolator output, in effect the channel transfer function H, is forwarded to a convolution unit 8 where a convolution is performed between the received signal Y and the channel transfer function H to arrive at an estimation $a_{est}$ of the originally transmitted data.

Figure 7:
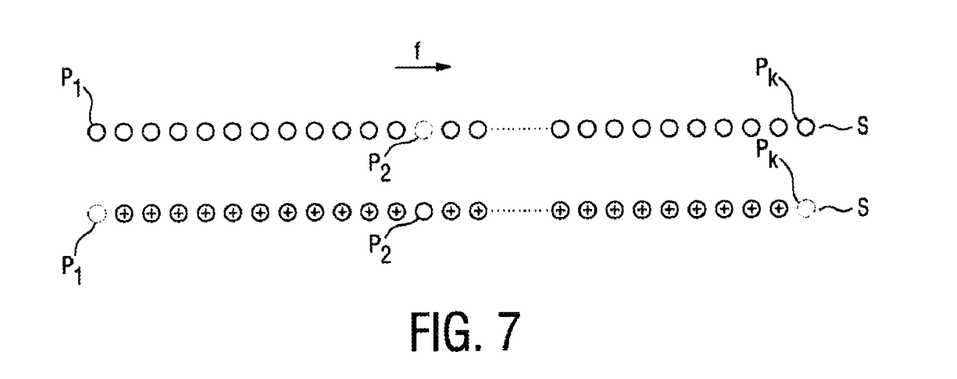
FIG. 7 shows a schematic representation of the channel estimation stages for the data and pilot carriers in an OFDM symbol.

FIG. 7 shows a schematic representation of the channel estimation stages for the data and pilot carriers in an OFDM symbol S. The dots represent carriers, and are arranged in order of increasing carrier frequency, as indicated by the arrow. In a first stage, indicated by the upper row of dots, the continual pilots $P_1, P_2, \ldots, P_k$, shown by the dark shaded dots, are identified. Then, in a second stage, with the information obtained from the continual pilots $P_1, P_2, \ldots, P_k$, frequency interpolation is performed in a single step on the remaining carriers. This is indicated by the '+' in the lower row of dots. Thus, the channel transfer function is obtained using a single symbol S.

Figure 8:
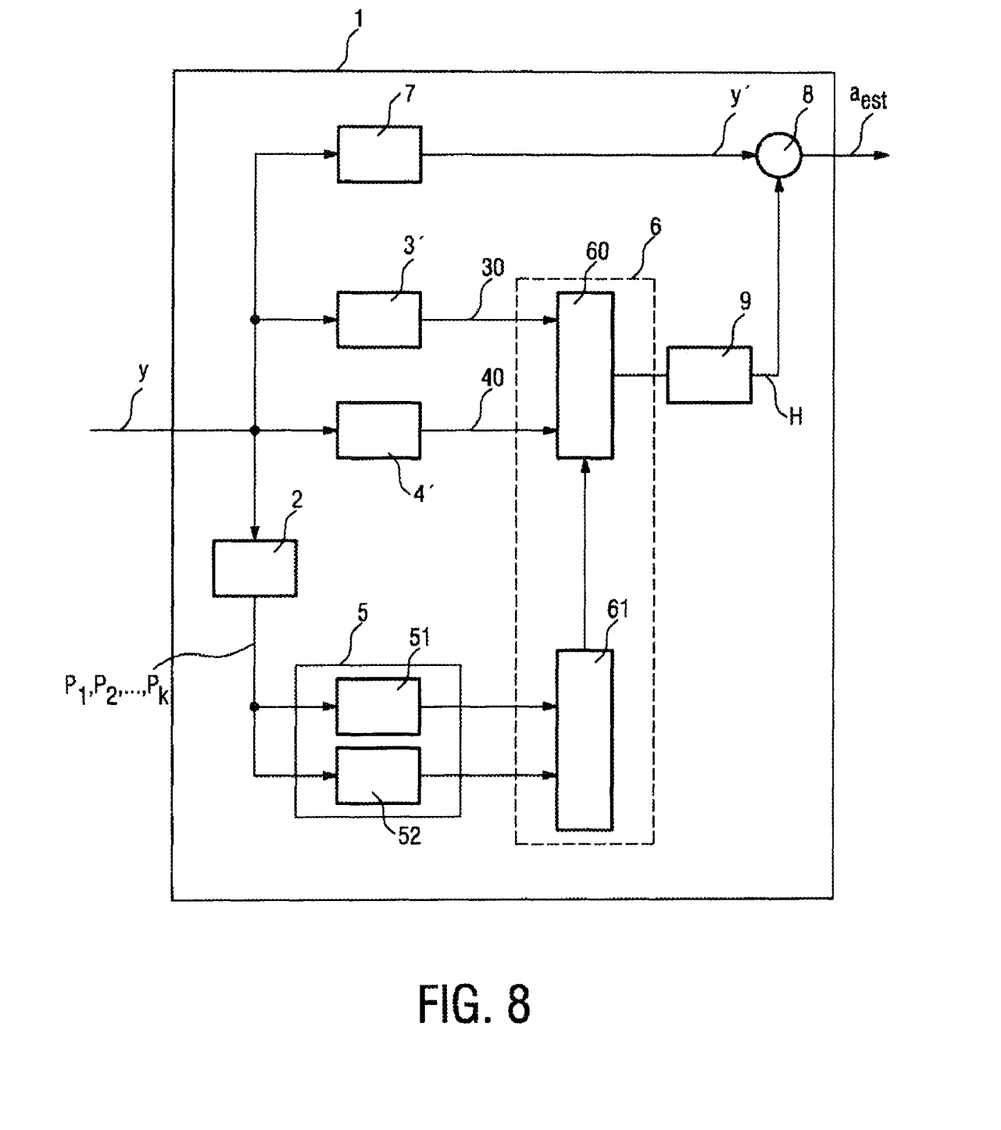
FIG. 8 shows an alternative system realisation according to a second embodiment of the invention.

FIG. 8 shows an alternative system embodiment, where the frequency-domain interpolator 4 and the time-domain interpolator both perform only a partial channel estimation, in this case on one quarter of the carriers if the incoming signal has scattered pilots on one quarter of the carriers. The decision as to which interpolator 3', 4' is to be used is made in the manner already described under FIG. 5. The output selected by the selection unit 6 is then subject to a further frequency-domain interpolator to complete the remaining channel estimation, giving the channel transfer function H.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method of estimating the transmission channel of a received multi-carrier signal in a mobile environment, which method comprises
   identifying pilots present on carriers of the received multi-carrier signal, which pilots comprise continual pilots;
   performing channel estimation on the received multi-carrier signal using a time-domain interpolator to give a first interpolator output;
   performing channel estimation on the received multi-carrier signal using a frequency-domain interpolator to give a second interpolator output;
   detecting a frequency offset in a continual pilot; and
   selecting either the first interpolator output or the second interpolator output on the basis of the detected frequency offset for estimating the transmission channel.

2. The method according to claim 1, wherein the step of detecting a frequency offset in a continual pilot comprises filtering the continual pilot in an offset filter to obtain an offset power value and estimating the frequency offset on the basis of the offset power value.

3. The method according to claim 2, wherein the frequency offset is estimated by comparing the offset power value to a threshold power value.

4. The method according to claim 2, wherein a cut-off frequency of the offset filter corresponds to a predefined frequency offset at which the time-domain interpolation of the received multi-carrier signal is subject to failure.

5. The method according to claim 4, wherein the second interpolator output is selected when the offset power value is greater than the threshold power value.

6. The method according to any of the preceding claims, wherein the continual pilot is filtered in a pilot carrier band-pass filter to obtain a pilot reference power value, which pilot reference power value corresponds to a frequency response of the continual pilot in a static environment.

7. The method according to claim 5, wherein the second interpolator output is selected when the current output of the pilot carrier band-pass filter is less than the pilot reference power value.

8. A system for estimating the transmission channel of a received multi-carrier signal in a mobile environment, comprising
   an identification unit for identifying pilots present on carriers of the received multi-carrier signal which pilots comprise continual pilots;
   a time-domain interpolator for performing channel estimation on the received multi-carrier signal to give a first interpolator output;
   a frequency-domain interpolator for performing channel estimation on the received multi-carrier signal to give a second interpolator output;
   an offset detection unit for detecting a frequency offset in a continual pilot; and
   a selection unit for selecting either the first interpolator output or the second interpolator output on the basis of the detected frequency offset for estimating the transmission channel.

9. A system according to claim 8, comprising a frequency-domain interpolator for performing an additional channel estimation on the interpolator output selected by the selection unit.

10. A programmable device for use in a system for estimating the transmission channel of a received multi-carrier signal in a mobile environment, wherein a computer program product is directly loadable into the memory of the programmable device, which computer program product comprises software code portions for performing the steps of a method according to claim 1 when said product is run on the programmable device.

11. The method of claim 1, wherein selecting either the first interpolator output or the second interpolator output on the basis of the detected frequency offset for estimating the transmission channel comprises selecting only one of the first interpolator output and the second interpolator output on the basis of the detected frequency offset for estimating the transmission channel.

12. The system of claim 8, wherein the selection unit is configured to select only one of the first interpolator output and the second interpolator output on the basis of the detected frequency offset for estimating the transmission channel.

* * * * *